US012620579B2

(12) United States Patent
Yang et al.

(10) Patent No.: US 12,620,579 B2
(45) Date of Patent: May 5, 2026

(54) METHOD FOR PREPARING CARBON-COATED LITHIUM IRON PHOSPHATE MATERIAL FROM FERROUS PHOSPHATE

(71) Applicant: HUBEI RT ADVANCED MATERIALS GROUP COMPANY LIMITED, Huangshi (CN)

(72) Inventors: Ji Yang, Huangshi (CN); Yihua Wei, Huangshi (CN); Jie Sun, Huangshi (CN); Zhonglin He, Huangshi (CN); Jianhao He, Huangshi (CN); Haijuan Liu, Huangshi (CN); Hao Li, Huangshi (CN); Menghua Yu, Huangshi (CN); Zhengchuang Cheng, Huangshi (CN); Xiong Wang, Huangshi (CN); Hongfu Qi, Huangshi (CN)

(73) Assignee: HUBEI RT ADVANCED MATERIALS GROUP COMPANY LIMITED, Huangshi (CN)

( * ) Notice: Subject to any disclaimer, the term of this patent is extended or adjusted under 35 U.S.C. 154(b) by 667 days.

(21) Appl. No.: 17/978,241

(22) Filed: Nov. 1, 2022

(65) Prior Publication Data

US 2023/0080632 A1 Mar. 16, 2023

(30) Foreign Application Priority Data

Mar. 22, 2022 (CN) .......................... 202210282867.5

(51) Int. Cl.
| | |
|---|---|
| *H01M 4/36* | (2006.01) |
| *H01M 4/04* | (2006.01) |
| *H01M 4/58* | (2010.01) |
| *H01M 4/62* | (2006.01) |
| *H01M 4/02* | (2006.01) |

(52) U.S. Cl.
CPC ......... *H01M 4/366* (2013.01); *H01M 4/0471* (2013.01); *H01M 4/5825* (2013.01); *H01M 4/625* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2015/0037666 A1 | 2/2015 | Jun et al. | |
| 2015/0236347 A1 | 8/2015 | Jang et al. | |
| 2015/0357633 A1 | 12/2015 | Jun et al. | |

FOREIGN PATENT DOCUMENTS

| | | | | |
|---|---|---|---|---|
| CN | 107819121 A | * | 3/2018 | ........ H01M 10/4242 |
| CN | 110970605 A | * | 4/2020 | .......... H01M 4/5825 |

* cited by examiner

*Primary Examiner* — Tanisha Diggs
(74) *Attorney, Agent, or Firm* — Hemisphere Law, PLLC

(57) ABSTRACT

The present disclosure relates to the technical field of lithium ion battery cathode materials, and particularly discloses a method for preparing a carbon-coated lithium iron phosphate material from ferrous phosphate. The method comprises: mixing self-made ferrous phosphate with a carbon source, and sintering at a low temperature under nitrogen to remove a part of crystal water to obtain carbon-coated ferrous phosphate with a small amount of crystal water; evenly mixing ferrous phosphate with a lithium source, a phosphorus source and multiple carbon sources, and adjusting until a proper iron-to-phosphorus ratio is 0.960-0.975 and a carbon content is 1.5%-1.8%; subsequently drying slurry to obtain material powder; and sintering the material powder through a two-stage temperature rising curve, naturally cooling and then pulverizing to obtain the carbon-coated lithium iron phosphate material. The nano lithium iron phosphate material prepared by the method has high compaction, high capacity and long cycle performance.

8 Claims, 3 Drawing Sheets

METHOD FOR PREPARING CARBON-COATED LITHIUM IRON PHOSPHATE MATERIAL FROM FERROUS PHOSPHATE

TECHNICAL FIELD

The present disclosure belongs to the technical field of lithium ion battery electrode materials, and particularly relates to a method for preparing a carbon-coated lithium iron phosphate material from ferrous phosphate.

BACKGROUND

A lithium iron phosphate material with an olivine structure has relatively high theoretical capacity of 170 mAh/g and relatively high discharge voltage of 3.4V, lithium ion deinterlacing has little effect on its solid structure during the charging and discharging. The lithium iron phosphate material, due to long cyclic life, rich resources, low price, small environment pollution, good chemical stability and other advantages, is considered as one of the most valuable lithium ion battery cathode materials.

Through the self-made ferrous phosphate material, hydrated ferrous phosphate raw materials with different iron-to-phosphorus ratios can be prepared, an organic carbon source is coated, low-temperature sintering is carried out at the atmosphere of nitrogen, in such the way, a part of crystal water is removed to increase the original iron-to-phosphorus ratio and improve the utilization rate of raw materials, thereby improving the quality of a finished product; meanwhile, the organic carbon source is decomposed so that the surface of the ferrous phosphate material is coated with a conductive carbon layer, thereby improving the conductivity of the material. Addition of a solid phase phosphorus source which is lithium phosphate and a liquid phase phosphorus source which is one or more of ammonium dihydrogen phosphate, diammonium hydrogen phosphate and phosphoric acid not only can provide a stable frame structure for synthesis of lithium iron phosphate but also allows phosphorus sources to be evenly mixed.

It is found from results that the carbon-coated ferrous phosphate containing a small amount of crystal water has higher discharge capacity and longer cyclic life compared with the traditional lithium iron phosphate material.

SUMMARY

The objective of the present disclosure is to provide a method for preparing a lithium iron phosphate material from ferrous phosphate in order to solve the problem of high lithium iron phosphate material cost. According to the method of the present disclosure, a precursor is treated to remove a part of crystal water, and a carbon layer with good conductivity is coated, so as to obtain a carbon-coated ferrous phosphate material; then by adding the lithium source, the iron source, the phosphorus source and the carbon source, a low-cost high-capacity long-cycle lithium iron phosphate material is prepared.

In order to realize the above objective, the present disclosure adopts the following technical solution:

Provided is a method for preparing a lithium iron phosphate material from ferrous phosphate, comprising the following steps:

(1) carrying out ball milling on ferrous phosphate containing crystal water and a carbon source to obtain powder;

(2) sintering the powder obtained in step (1) at a protective atmosphere to remove a part of crystal water to obtain carbon-coated ferrous phosphate containing crystal water;

(3) evenly mixing the carbon-coated ferrous phosphate containing crystal water obtained in step (2) with lithium phosphate, a solid phase phosphorus source, a liquid phase phosphorus source, a carbon source and a dispersant to obtain mixed slurry; and (4) drying the mixed slurry obtained in step (3), then sintering the dried slurry at an inert atmosphere, followed by naturally cooling and pulverizing, so as to obtain the carbon-coated nano lithium iron phosphate material.

Preferably, in step (1), in the ferrous phosphate containing crystal water, Fe/p is 1.46-1.50.

Preferably, in step (1), the carbon source is an organic carbon source which is one or more of glucose, polyethylene glycol (PEG), saccharose, starch or citric acid, and the ball milling mode is wet ball milling or dry ball milling More preferably, the organic carbon source is PEG.

Preferably, in step (2), a gas used in the protective atmosphere is at least one of nitrogen, argon or helium; the sintering temperature is 250-400° C., and the sintering time is 3-6 h, more preferably the sintering temperature is 300-400° C., and the sintering time is 3-5 h; in the carbon-coated ferrous phosphate containing crystal water, the chemical formula of ferrous phosphate is $Fe_3(PO_4)_2*xH_2O$, wherein x=2-4.

Preferably, in step (3), the solid phase phosphorus source is lithium phosphate; the liquid phase phosphorus source is one or more of ammonium dihydrogen phosphate, diammonium hydrogen phosphate and phosphoric acid, the carbon sources are the organic carbon source and an inorganic carbon source, the dispersant is water, and an iron-to-phosphorus ratio in the mixed slurry is 0.960-0.975.

Preferably, in step (3), the organic carbon source is one or more of glucose, PEG, saccharose, starch or citric acid, more preferably one or two of glucose or PEG; the inorganic carbon source is one or more of acetylene black, graphite, Super-P and carbon nanotubes, and the iron-to-phosphorus ratio in the mixed slurry is 0.960-0.975.

Preferably, in step (4), the drying mode is one or more of spray drying, forced air drying or vacuum drying; a gas for spray drying is at least one of nitrogen, argon and helium, an inlet air temperature for spray drying is 130-150° C., and an outlet air temperature for spray drying is 80-100° C.

Preferably, in step (4), the gas used in the inert atmosphere is at least one of nitrogen, argon and helium; the sintering process is divided into two stage, the first-stage temperature is 750-770° C., the preservation time is 7 h, the second-stage temperature is 760-780° C., and the preservation time is 1 h; the powder is pulverized to a particle size of 0.8-3 µm after being sintered.

In addition, the present disclosure also provides a carbon-coated lithium iron phosphate material prepared by the method and use of the carbon-coated lithium iron phosphate material prepared by the method as a lithium ion battery cathode material.

Compared with the prior art, the present disclosure has the following advantages and beneficial effects:

1. The ferrous phosphate is mixed with the carbon source, and sintering is carried out at a low temperature to remove a part of crystal water, so as to improve the proportions of iron and phosphorous in the raw material and further improve the utilization rate of the raw material; further low-temperature sintering at the atmosphere of nitrogen can decompose the carbon source to form a carbon coating layer on the surface of ferrous phosphate, which not only inhibits the oxidization of bivalent iron to reduce trivalent iron into divalent iron, but also can improve the conductivity of the material, and also inhibits the excessive growth of particles to form the carbon-coated lithium iron phosphate material with uniform particle size.

2. In the present disclosure, ferrous phosphate and lithium phosphate are used as raw materials, which can reduce synthesis cost; ammonium dihydrogen phosphate, diammonium hydrogen phosphate and phosphoric acid are added as supplemental liquid phase phosphorus sources, and adjustment is carried out until the proper iron-to-phosphorous ratio is reached.

3. The inorganic carbon source and the inorganic carbon source are added, the organic carbon source can provide a reductive gas at the atmosphere of nitrogen to reduce the content of trivalent iron in lithium iron phosphate, and also can provide coated carbon to further improve the conductivity of the lithium iron phosphate material. The inorganic carbon source is mixed in the slurry, which can provide a multi-branched conductive network, thereby reducing the physical internal resistance of the lithium iron phosphate material and providing electron conductivity.

4. There is a two-stage sintering temperature curve, wherein in the first-stage sintering process, the lithium iron phosphate material with small particles; the second-stage sintering process, the temperature is raised, which can promote the growth of the lithium iron phosphate particle and improve the compaction of the lithium iron phosphate material.

The carbon-coated lithium iron phosphate material prepared by the method of the present disclosure has excellent material performances: 1 C initial charge-discharge capacity can be up to 148.39 mAh/g, the discharge capacity can be up to 141.84 mAh/g after 150 1 C charge-discharge cycles, and the capacity retention rate can be up to 95.59% after 150 1 C charge-discharge cycles.

DETAILED DESCRIPTION OF THE EMBODIMENTS

Figure 1:
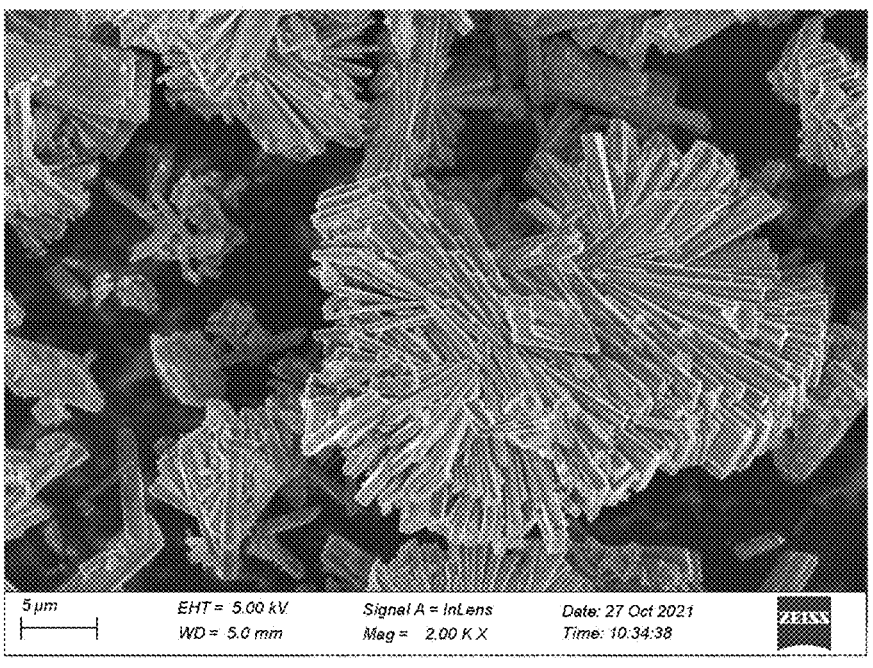
FIG. 1 is a scanning electrode microscope (SEM) graph of self-mode ferrous phosphate with an iron-to-phosphorous ratio of 1.46 in example 1 according to the present disclosure.
Figure 2:
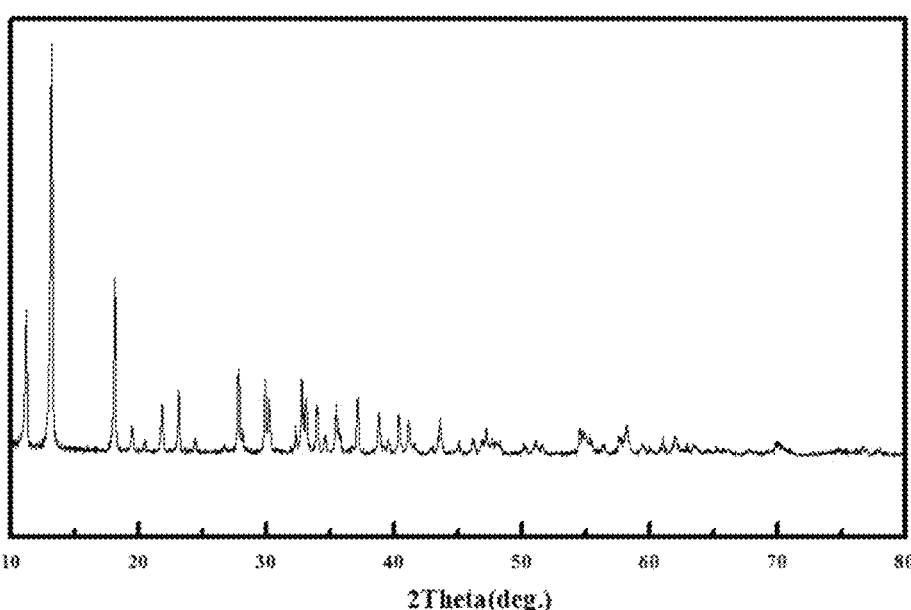
FIG. 2 is an X-ray diffraction (XRD) graph of self-mode ferrous phosphate with an iron-to-phosphorous ratio of 1.46 in example 1 according to the present disclosure.
Figure 3:
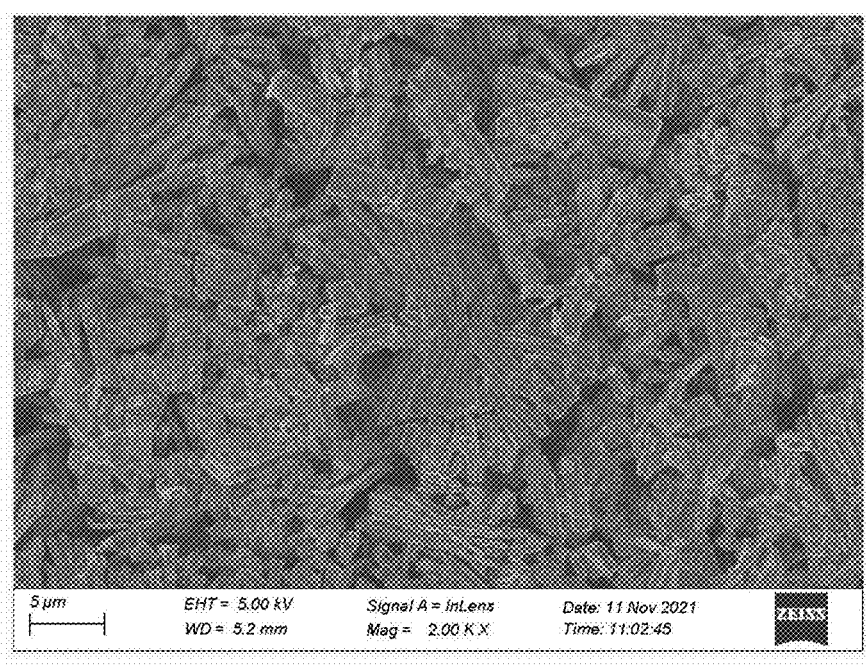
FIG. 3 is an SEM graph of carbon-coated ferrous phosphate containing crystal water in example 1 according to the present disclosure.
Figure 4:
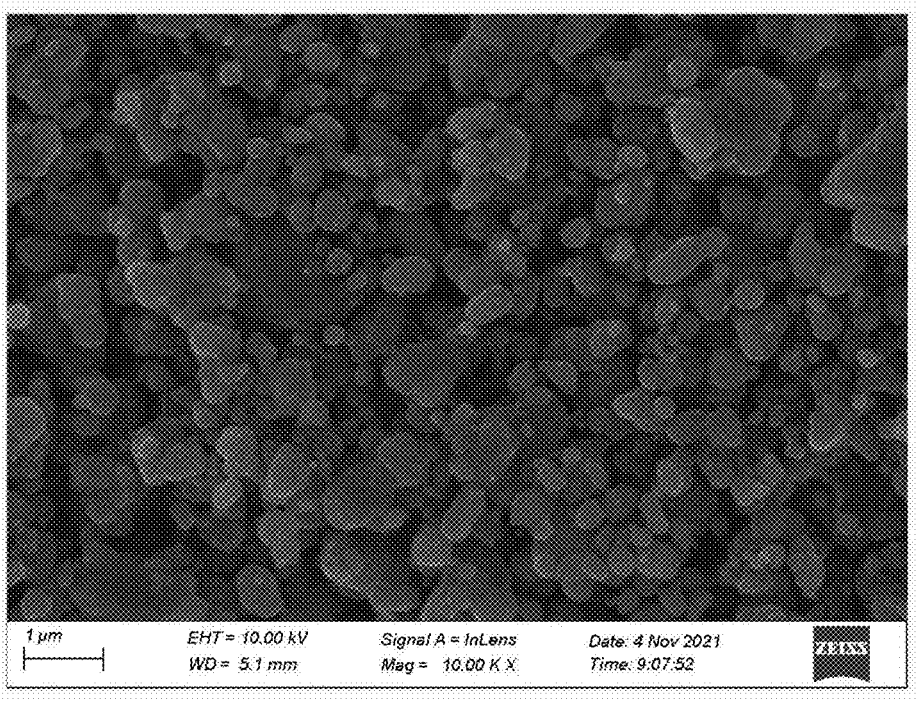
FIG. 4 is an SEM graph of a lithium iron phosphate material prepared in example 1 according to the present disclosure.
Figure 5:
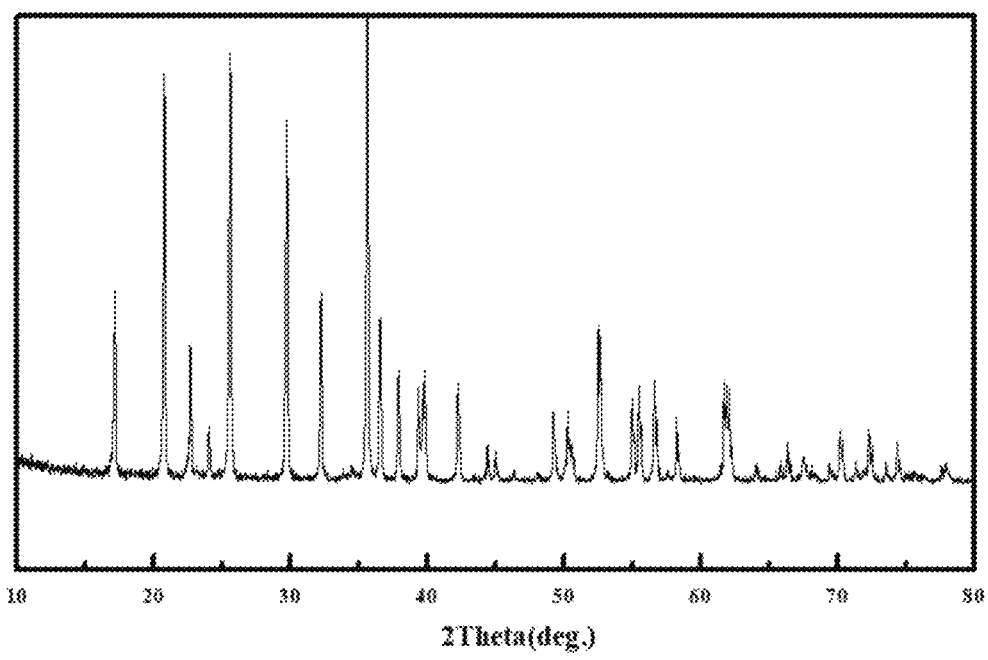
FIG. 5 is an XRD graph of a lithium iron phosphate material prepared in example 1 according to the present disclosure.
Figure 6:
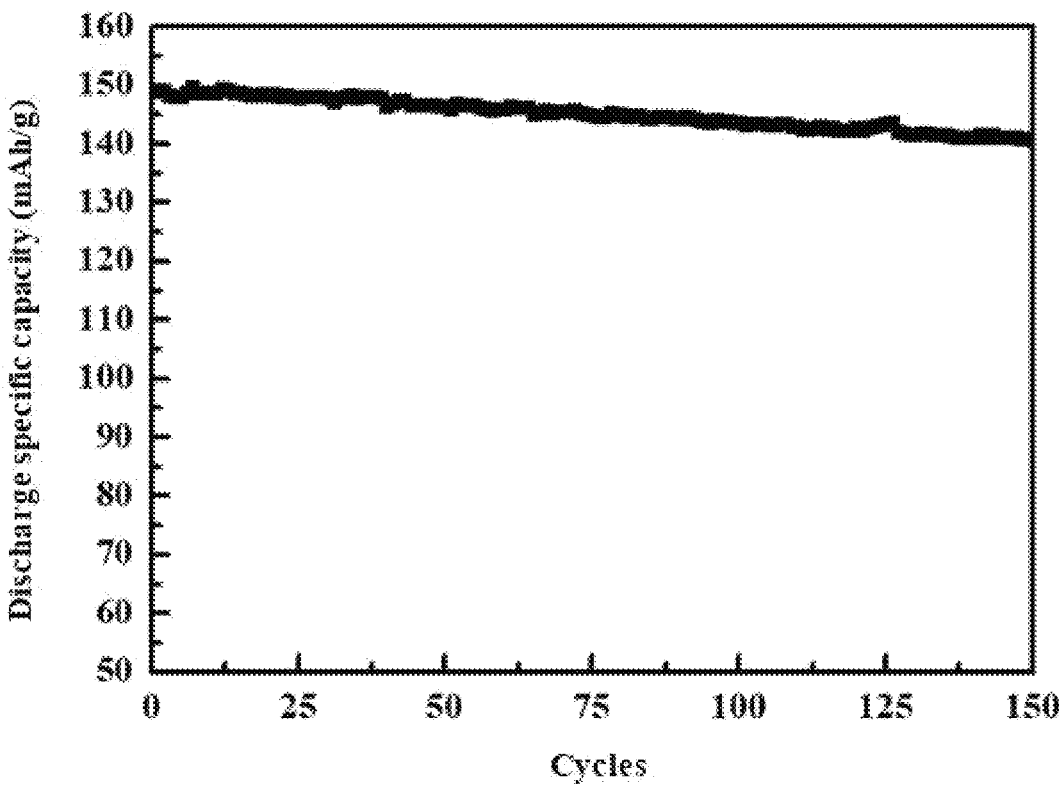
FIG. 6 is a cyclic curve graph of a sample in example 1 according to the present disclosure.

The specific embodiments of the present disclosure will be described in detail in combination with drawings. It should be understood that specific embodiments described herein are only for illustrating and explaining the present disclosure, but not limiting the present disclosure.

The end points and any values of the ranges disclosed herein are not limited to precise ranges or values, these ranges or values should be understood as containing values close to these ranges or values. For the ranges of numeral values, one or more new numerical ranges can be obtained by combining the end values of each range, between the end values of each range and individual point values, and between individual point values. These numerical ranges should be considered as specifically disclosed herein.

The present disclosure will be described in detail through examples, but the protective scope of the present disclosure is not limited thereto.

Example 1

A method for preparing a lithium iron phosphate material from ferrous phosphate comprises the following steps:

(1) ferrous phosphate with an iron-to-phosphorous ratio of 1.46 containing crystal water and glucose were subjected to ball milling to obtain powder, wherein a mass ratio of glucose to ferrous phosphate was 3%;

(2) the powder obtained in step (1) was preserved for 2 h at 400° C. at the atmosphere of nitrogen and then sintered to remove crystal water to obtain carbon-coated ferrous phosphate containing crystal water;

(3) the carbon-coated ferrous phosphate containing crystal water obtained in step (2) was evenly mixed with 1000 g of lithium phosphate, 8 g of ammonium dihydrogen phosphate, 89 g of PEG, 10 g of acetylene black and 2500 g of water for 2 h to obtain mixed slurry;

(4) the mixed slurry obtained in step (3) was subjected to spray drying at the atmosphere of nitrogen to obtain dried powder, wherein an inlet air temperature was 150° C., an outlet air temperature was 100° C., then the dried powder was sintered at the atmosphere of nitrogen, wherein the first-stage sintering temperature was 750° C., the preservation time was 7 h; the second-stage sintering temperature was 760° C., the preservation time was 1 h, and the product after sintering was naturally cooled and pulverized to obtain the carbon-coated nano lithium iron phosphate material, wherein the size of the pulverized particle was controlled to D50=1.6 μm.

Example 2

A method for preparing a lithium iron phosphate material from ferrous phosphate comprises the following steps:

(1) ferrous phosphate with an iron-to-phosphorous ratio of 1.48 containing crystal water and glucose were subjected to ball milling to obtain powder, wherein a mass ratio of glucose to ferrous phosphate was 2%;

(2) the powder obtained in step (1) was preserved for 2.5 h at 380° C. at the atmosphere of nitrogen and then sintered to remove crystal water to obtain carbon-coated ferrous phosphate containing crystal water;

(3) 1000 g of carbon-coated ferrous phosphate containing crystal water obtained in step (2) was evenly mixed with 294 g of lithium phosphate, 6 g of ammonium dihydrogen phosphate, 99 g of glucose, 4 g of acetylene black and 2500 g of water for 3 h to obtain mixed slurry;

(4) the mixed slurry obtained in step (3) was subjected to spray drying at the atmosphere of nitrogen to obtain dried powder, wherein an inlet air temperature was 145° C., an outlet air temperature was 90° C., then the dried powder was sintered at the atmosphere of nitrogen, wherein the first-stage sintering temperature was 755° C., the preservation time was 7 h; the second-stage sintering temperature was 765° C., the preservation time was 1 h, and the product after sintering was naturally cooled and pulverized to obtain the carbon-coated nano lithium iron phosphate material, wherein the size of the pulverized particle was controlled to D50=1.3 μm.

Example 3

A method for preparing a lithium iron phosphate material from ferrous phosphate comprises the following steps:
(1) ferrous phosphate with an iron-to-phosphorous ratio of 1.5 containing crystal water and glucose were subjected to ball milling to obtain powder, wherein a mass ratio of glucose to ferrous phosphate was 2.5%;
(2) the powder obtained in step (1) was preserved for 3 h at 350° C. at the atmosphere of nitrogen and then sintered to remove crystal water to obtain carbon-coated ferrous phosphate containing crystal water;
(3) 1000 g of carbon-coated ferrous phosphate containing crystal water obtained in step (2) was evenly mixed with 294 g of lithium phosphate, 4 g of phosphoric acid, 84 g of glucose, 4 g of graphite and 2500 g of water for 4 h to obtain mixed slurry;
(4) the mixed slurry obtained in step (3) was subjected to spray drying at the atmosphere of nitrogen to obtain dried powder, wherein an inlet air temperature was 130° C., an outlet air temperature was 95° C., then the dried powder was sintered at the atmosphere of nitrogen, wherein the first-stage sintering temperature was 760° C., the preservation time was 7 h; the second-stage sintering temperature was 770° C., the preservation time was 1 h, and the product after sintering was naturally cooled and pulverized to obtain the carbon-coated nano lithium iron phosphate material, wherein the size of the pulverized particle was controlled to D50=1.6 μm.

Example 4

A method for preparing a lithium iron phosphate material from ferrous phosphate comprises the following steps:
(1) ferrous phosphate with an iron-to-phosphorous ratio of 1.46 containing crystal water and glucose were subjected to ball milling to obtain powder, wherein a mass ratio of glucose to ferrous phosphate was 2%;
(2) the powder obtained in step (1) was preserved for 2 h at 400° C. at the atmosphere of nitrogen and then sintered to remove crystal water to obtain carbon-coated ferrous phosphate containing crystal water;
(3) 1000 g of carbon-coated ferrous phosphate containing crystal water obtained in step (2) was evenly mixed with 294 g of lithium phosphate, 6 g of ammonium dihydrogen phosphate, 89 g of PEG, 12 g of carbon nano tube and 2500 g of water for 2 h to obtain mixed slurry;
(4) the mixed slurry obtained in step (3) was subjected to spray drying at the atmosphere of nitrogen to obtain dried powder, wherein an inlet air temperature was 140° C., an outlet air temperature was 80° C., then the dried powder was sintered at the atmosphere of nitrogen, wherein the first-stage sintering temperature was 770° C., the preservation time was 7 h; the second-stage sintering temperature was 780° C., the preservation time was 1 h, and the product after sintering was naturally cooled and pulverized to obtain the carbon-coated nano lithium iron phosphate material, wherein the size of the pulverized particle was controlled to D50=1.2 μm.

Example 5

A method for preparing a lithium iron phosphate material from ferrous phosphate comprises the following steps:
(1) ferrous phosphate with an iron-to-phosphorous ratio of 1.47 containing crystal water and glucose were subjected to ball milling to obtain powder, wherein a mass ratio of glucose to ferrous phosphate was 3.5%;
(2) the powder obtained in step (1) was preserved for 3 h at 360° C. at the atmosphere of nitrogen and then sintered to remove crystal water to obtain carbon-coated ferrous phosphate containing crystal water;
(3) 1000 g of carbon-coated ferrous phosphate containing crystal water obtained in step (2) was evenly mixed with 294 g of lithium phosphate, 6 g of ammonium dihydrogen phosphate, 44 g of glucose, 10 g of Super-P and 2500 g of water for 3 h to obtain mixed slurry;
(4) the mixed slurry obtained in step (3) was subjected to spray drying at the atmosphere of nitrogen to obtain dried powder, wherein an inlet air temperature was 135° C., an outlet air temperature was 85° C., then the dried powder was sintered at the atmosphere of nitrogen, wherein the first-stage sintering temperature was 760° C., the preservation time was 7 h; the second-stage sintering temperature was 770° C., the preservation time was 1 h, and the product after sintering was naturally cooled and pulverized to obtain the carbon-coated nano lithium iron phosphate material, wherein the size of the pulverized particle was controlled to D50=1.5 μm.

Example 6

A method for preparing a lithium iron phosphate material from ferrous phosphate comprises the following steps:
(1) ferrous phosphate with an iron-to-phosphorous ratio of 1.49 containing crystal water and glucose were subjected to ball milling to obtain powder, wherein a mass ratio of glucose to ferrous phosphate was 3%;
(2) the powder obtained in step (1) was preserved for 4 h at 280° C. at the atmosphere of nitrogen and then sintered to remove crystal water to obtain carbon-coated ferrous phosphate containing crystal water;
(3) 1000 g of carbon-coated ferrous phosphate containing crystal water obtained in step (2) was evenly mixed with 294 g of lithium phosphate, 8 g of phosphoric acid, 88 g of citric acid, 12 g of graphene and 2500 g of water for 3 h to obtain mixed slurry;
(4) the mixed slurry obtained in step (3) was subjected to spray drying at the atmosphere of nitrogen to obtain dried powder, wherein an inlet air temperature was 140° C., an outlet air temperature was 85° C., then the dried powder was sintered at the atmosphere of nitrogen, wherein the first-stage sintering temperature was 755° C., the preservation time was 7 h; the second-stage sintering temperature was 765° C., the preservation time was 1 h, and the product after sintering was naturally cooled and pulverized to obtain the carbon-coated nano lithium iron phosphate material, wherein the size of the pulverized particle was controlled to D50=1.8 μm.

Comparative Example 1

Different from examples, in step (1), the iron-to-phosphorous ratio in self-made ferrous phosphate is 1:4, the phosphorous source is needed to be supplemented instead of iron source, in order to prepare a lithium iron phosphate material with a proper iron-to-phosphorous ratio.

A method for preparing a lithium iron phosphate material from ferrous phosphate comprises the following steps:

(1) ferrous phosphate with an iron-to-phosphorous ratio of 1.4 containing crystal water and glucose were subjected to ball milling to obtain powder, wherein a mass ratio of glucose to ferrous phosphate was 2%;

(2) the powder obtained in step (1) was preserved for 2 h at 400° C. at the atmosphere of nitrogen and then sintered to remove crystal water to obtain carbon-coated ferrous phosphate containing crystal water;

(3) 1000 g of carbon-coated ferrous phosphate containing crystal water obtained in step (2) was evenly mixed with 312 g of lithium phosphate, 30 g of iron oxide, 93 g of PEG, 10 g of acetylene black and 2500 g of water for 2 h to obtain mixed slurry;

(4) the mixed slurry obtained in step (3) was subjected to spray drying at the atmosphere of nitrogen to obtain dried powder, wherein an inlet air temperature was 150° C., an outlet air temperature was 100° C., then the dried powder was sintered at the atmosphere of nitrogen, wherein the first-stage sintering temperature was 750° C., the preservation time was 7 h; the second-stage sintering temperature was 760° C., the preservation time was 1 h, and the product after sintering was naturally cooled and pulverized to obtain the carbon-coated nano lithium iron phosphate material, wherein the size of the pulverized particle was controlled to D50=1.6 μm.

Comparative Example 2

Different from the methods in examples, the powder in step (1) is preserved for 2 h at the atmosphere of nitrogen at 30° C.

A method for preparing a lithium iron phosphate material from ferrous phosphate comprises the following steps:

(1) ferrous phosphate with an iron-to-phosphorous ratio of 1.46 containing crystal water and glucose were subjected to ball milling to obtain powder, wherein a mass ratio of glucose to ferrous phosphate was 2%;

(2) the powder in step (1) is preserved for 2 h at the atmosphere of nitrogen at 30° C., in such the way, the crystal water cannot be removed by sintering, only the mixture of ferrous phosphate and glucose;

(3) 1000 g of carbon-coated ferrous phosphate containing crystal water obtained in step (2) was evenly mixed with 245 g of lithium phosphate, 8 g of ammonium dihydrogen phosphate, 74 g of PEG, 10 g of acetylene black and 2500 g of water for 2 h to obtain mixed slurry, the iron-to-phosphorous ratio in the finished product was adjusted to 0.965, and the content of carbon in the finished product was adjusted to 1.5%;

(4) the mixed slurry obtained in step (3) was subjected to spray drying at the atmosphere of nitrogen to obtain dried powder, wherein an inlet air temperature was 150° C., an outlet air temperature was 100° C., then the dried powder was sintered at the atmosphere of nitrogen, wherein the first-stage sintering temperature was 750° C., the preservation time was 7 h; the second-stage sintering temperature was 760° C., the preservation time was 1 h, and the product after sintering was naturally cooled and pulverized to obtain the carbon-coated nano lithium iron phosphate material, wherein the size of the pulverized particle was controlled to D50=1.6 μm.

Test Example

The lithium iron phosphate cathode materials prepared in examples 1-6 and comparative examples 1-2 together with Super-P and polyvinylidene fluoride (PVDF) were dispersed into N-methylpyrrolidone (NMP) in a mass ratio of 80:10:10, the obtained mixture solution was evenly dispersed through ball milling, and then the obtained dispersed solution was coated onto aluminum foil and dried in vacuum to obtain a positive plate, wherein an electrolyte was 1 mol/L $LiPF_6$, a solvent volume ratio was EC:DMC:EMC=1:1:1 (volume ratio), a diaphragm was a Celgard polypropylene film, and a lithium metal sheet was an anode, and then the above materials were assembled into a button battery. A range of a test voltage is 2.5 V-3.9 V, the voltage is charged to 3.9 V in a constant-current constant-voltage manner, the voltage is discharged to 2.5 V in a constant-current discharge manner, charge-discharge current is 0.2 C for 3 cycles; and then 1 C charge discharge current for 150 cycles, the cut-off condition is the same as 0.2 C. Test results are as shown in Table 1.

TABLE 1

| Example number | 1 C Initial discharge specific capacity (mAh/g) | 1 C Discharge specific capacity at 150 weeks (mAh/g) | 1 C Capacity retention rate at 150 weeks (%) |
|---|---|---|---|
| Example 1 | 149.17 | 140.07 | 93.90 |
| Example 2 | 147.45 | 139.82 | 94.83 |
| Example 3 | 148.17 | 136.03 | 91.81 |
| Example 4 | 147.37 | 135.03 | 91.63 |
| Example 5 | 148.39 | 141.84 | 95.59 |
| Example 6 | 146.06 | 135.63 | 92.86 |
| Comparative example 1 | 142.80 | 112.67 | 78.90 |
| Comparative example 2 | 142.94 | 125.29 | 87.65 |

It can be seen from the results in Table 1 that after the lithium ion battery is prepared from the carbon coated lithium iron phosphate material prepared by the method of the present disclosure, the specific capacity of 1 C initial discharge, the specific capacity of 150 cycles of 1 C charge discharge cycle and the capacity retention rate of 150 cycles of 1 C charge discharge cycle are improved.

The preferred embodiments of the present disclosure are described in detail above, but the present disclosure is not limited thereto. Within the scope of the technical concept of the present disclosure, multiple simple modifications can be made to the technical solution of the present disclosure, including the combination of various technical features in any other appropriate way. These simple modifications and combinations should also be regarded as the contents disclosed by the present disclosure, and belong to the protective scope of the present disclosure.

What is claimed is:

1. A method for preparing a carbon-coated lithium iron phosphate material from ferrous phosphate, comprising the following steps:

S1 carrying out ball milling on ferrous phosphate containing water of crystallization and a carbon source to obtain powder;

S2 sintering the powder obtained in step S1 at a protective atmosphere to remove a part of the water of crystallization to obtain carbon-coated ferrous phosphate containing water of crystallization; wherein the sintering temperature is 250-400° C.;

S3 evenly mixing the carbon-coated ferrous phosphate containing water of crystallization obtained in step S2 with a solid phase phosphorus source, a liquid phase phosphorus source, a carbon source and a dispersant to obtain mixed slurry; and S4 drying the mixed slurry obtained in step S3, then sintering the dried slurry at an inert atmosphere, followed by naturally cooling and pulverizing, so as to obtain the carbon-coated nano lithium iron phosphate material.

2. The method according to claim 1, wherein in step S1, in the ferrous phosphate containing water of crystallization, a Fe/p molar ratio is 1.46-1.50; a mass ratio of the carbon source to ferrous phosphate is 0.02-0.035:1.

3. The method according to claim 1, wherein in step S1, the carbon source is an organic carbon source which is one or more of glucose, PEG, saccharose, starch or citric acid, and the ball milling mode is wet ball milling or dry ball milling.

4. The method according to claim 1, wherein in step S2, a gas used in the protective atmosphere is at least one of nitrogen, argon or helium; the sintering time is 3-6 h; in the carbon-coated ferrous phosphate containing water of crystallization, the chemical formula of ferrous phosphate is $Fe_3(PO_4)_2 \cdot xH_2O$, wherein x=2-4.

5. The method according to claim 1, wherein in step S3, the solid phase phosphorus source is lithium phosphate; the liquid phase phosphorus source is one or more of ammonium dihydrogen phosphate, diammonium hydrogen phosphate and phosphoric acid, the carbon sources are the organic carbon source or an inorganic carbon source, the dispersant is water, and an iron-to-phosphorus molar ratio in the mixed slurry is 0.960-0.975.

6. The method according to claim 5, wherein the organic carbon source is one or more of glucose, PEG, saccharose, starch or citric acid, the inorganic carbon source is one or more of acetylene black, graphite, Super-P and carbon nanotubes, and the iron-to-phosphorus ratio in the mixed slurry is 0.960-0.975.

7. The method according to claim 1, wherein in step S4, the drying mode is one or more of spray drying, forced air drying or vacuum drying; a gas for spray drying is at least one of nitrogen, argon and helium, an inlet air temperature for spray drying is 130-150° C., and an outlet air temperature for spray drying is 80-100° C.

8. The method according to claim 1, wherein in step S4, the gas used in the inert atmosphere is at least one of nitrogen, argon and helium; the sintering process is divided into two stages, the first-stage temperature is 750-770° C., the preservation time is 7 h, the second-stage temperature is 760-780° C., and the preservation time is 1 h; the powder is pulverized to a particle size of 0.8-3 μm after being sintered.

* * * * *